May 6, 1958  J. W. GRAY  2,833,971
ROTARY INDUCTOR SIGNAL TRANSMITTER
Filed June 25, 1956

INVENTOR.
JOHN W. GRAY
BY H. I. Mackey
ATTORNEY

United States Patent Office 2,833,971
Patented May 6, 1958

2,833,971

ROTARY INDUCTOR SIGNAL TRANSMITTER

John W. Gray, Pleasantville, N. Y., assignor to General Precision Laboratory Incorporated, a corporation of New York Application June 25, 1956, Serial No. 593,434

8 Claims. (Cl. 318—30)

This invention relates to electrical servomechanisms having stops to limit their mechanical motions, and more particularly to such devices associated with rotary inductor signal transmitters.

Rotary inductor or synchro systems for transmitting indications of angle to a distant point include an input shaft, an output shaft, and an electrical circuit which slaves the latter to the former. The output shaft may in some cases be provided with stops to limit its rotation, for example the output shaft may be used to drive a potentiometer having stops. In such a case, when the input shaft rotates continuously in one direction, the output shaft will "freeze" against one of its stops. After this has happened, as the input shaft rotation continues the output shaft remains stationary until the input shaft has moved at least 180 degrees beyond the point of stopping of the output shaft.

It is one purpose of this invention to provide a circuit and equipment to prevent such "freezing" against a stop. The invention does this by causing the output shaft to reverse its rotation and take a position near the other stop so that when the input shaft re-enters the useful sector the output shaft follows it accurately, and is never prevented from so doing by being "frozen" against one of its stops.

Another purpose of this invention is to provide a synchro system having a servomechanism output shaft with a limited range of motion, with means for keeping the output shaft at an angle representing the input shaft angle within the limited range.

Another purpose is to provide an arrangement for preventing immobilization of a synchro servo system operating between limit stops.

A further understanding of this invention may be secured from the detailed description and drawings, in which.

Figure 1:
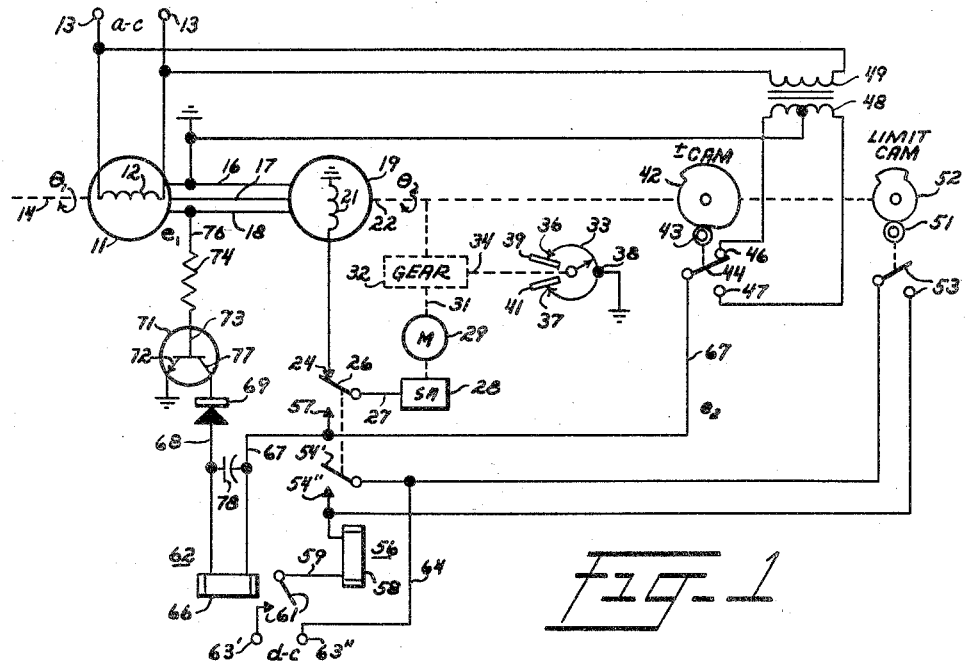
Figure 1 is a schematic wiring diagram of an embodiment of the invention.

Referring now to Fig. 1, a synchro transmitter 11 has a rotating field winding 12 which is energized from alternating current supply terminals 13. For the purpose of description the synchro transmitter 11 is considered to have three-phase stationary armature windings, but the present invention can as well employ a two-phase or other multiphase synchro system. The signal input shaft 14 is positioned to an angular magnitude $\theta_1$ which constitutes the input signal, and which is represented by the relative amplitudes or space phases of the alternating potentials induced between pairs of the three output signal conductors or lines 16, 17 and 18. This input shaft angular magnitude may be termed the mechanical phase of the input signal relative to some specified standard mechanical phase.

A second synchro instrument 19 is similar to the synchro transmitter 11 but is employed as a control transformer. The three-phase windings of synchro 19 are energized from conductors 16, 17 and 18, and the output derived from its rotor winding 21 constitutes an error voltage representative of the sine of the difference between the angular position of winding 21 and the angular position of winding 12 when the zero orientations are as depicted. Thus, if the multiphase windings of synchros 11 and 19 are similarly oriented and the rotor windings 12 and 19 are also similarly oriented, the potential induced in the receiver winding 21 is maximum. When the two windings are oriented 90° apart as in the drawing the error difference potential induced in winding 21 is zero. The displacement angle $\theta_2$ of the rotor shaft 22 of synchro 19 constitutes the synchro output.

One terminal of winding 21 is grounded and the other terminal is connected through conductor 23, relay contact 24, relay contact arm 26 and conductor 27 to the input of a phase-sensitive servoamplifier 28. This amplifier 28 is connected to operate a motor 29 having its shaft 31 connected through a suitable speed reduction gear 32 to turn synchro shaft 22. This feedback connection from winding 21 to shaft 22 is in negative sense, so that rotation of shaft 22 by motor 29 is in the direction to reduce the error output signal of winding 21 to zero, which occurs when winding 21 is at a position 90° from that of winding 12, the whole constituting a position servomechanism.

As so far described the synchro and servo system are conventional and produce an output shaft displacement angle $\theta_2$ representative of input shaft displacement angle $\theta_1$ without ambiguity within 360°.

In addition to the mechanical output displacement angle $\theta_2$, an electrical output representing that angle may be required and is produced by the potentiometer 33. This potentiometer is of the ten-turn type, although depicted for convenience as single-turn, and is connected by means of a shaft 34 to the gear 32, so that the potentiometer 33 is driven by motor 29 at such speed that the potentiometer 33 completes its ten turns while the rotor of the control transformer 19 makes about two-thirds of a turn. The potentiometer terminals 36 and 37 may be excited in any manner, such as by connection to a direct-current or alternating current source, and its resistor midterminal 38 is grounded. The mechanical limits of its travel are defined by stops 39 and 41.

In place of the ten-turn potentiometer any other type may be employed, such as a one-turn type, which may also have mechanical stops. When it does have stops the means of this invention are required to eliminate "freezing" against a stop. In any such case the gear ratio is such that the potentiometer 33 is driven through its complete range between stops while the control transformer 19 turns through less than one revolution.

The angular position $\theta_2$ of shaft 22 is measured from its center position, which is taken as zero degrees, with its limits of travel designated as +120° and —120°. The sensing of positive and negative angles is effected by a cam 42 so positioned that its follower 43 operates a contact arm 44 only when $\theta_2$ passes through zero. As drawn, the shaft 22 is at a small positive angle and contact arm 44 is in contact with its fixed contact 46. Upon rotation of shaft 22 through zero to a negative angular position the shaft rotates cam 42 clockwise moving arm 44 to contact 47. Contacts 46 and 47 are connected to opposite ends of a transformer secondary winding 48 having its center tap connected to one of the synchro lines 16. This tap is also grounded. The transformer primary winding 49 is connected to the alternating current source terminals 13. Thus alternating potentials relative to that of line 16 of opposite phase senses are applied to contacts 46 and 47. The potential of arm 44 is termed $e_2$.

At the angular limits of movement of shaft 22 it actuates the follower 51 of a cam 52 to close contacts 53. These contacts are in parallel with the contacts 54' and 54" of an electromagnetic relay 56. Contact arm 26 of the same relay 56 is connected to the input conductor 27 of servoamplifier 28 as stated and transfers this input, when operated, from fixed contact 24 to fixed contact 57. The coil 58 of the relay 56 is connected through conductor 59 and the normally-open contacts 61 of a second relay 62 to direct-current power-supply terminal 63'. The other supply terminal 63" is connected through conductor 64 to relay arm 54', and contact 54" is connected to coil 58. The coil 66 of relay 62 is connected through conductor 67 to the contact arm 44 so that the potential $e_2$ is impressed thereon. The other coil terminal is connected through conductor 68, a rectifier 69 and amplifier 71 to the synchro line 18, the potential of which relative to that of line 16 is termed $e_1$. The amplifier 71 consists of a three-terminal transistor having its emitter grounded to provide returns for synchro line 18 and winding 48. The base 73 is connected through a resistor 74 and conductor 76 to the synchro line 18, and the collector 77 is connected through the crystal diode rectifier 69 to conductor 68. The transistor is of the NPN type, requiring positive collector bias current, and the diode 69 is poled to permit such current flow while preventing the opposite flow, which could destroy the transistor. A capacitor 78 is connected between conductors 67 and 68 to integrate the signals applied to coil 66.

In the operation of transistor 71 and diode 69 an instantaneous positive potential on line 18 causes positive current to flow in base 72 toward the transistor which in turn causes an amplified positive current of linearly representative amplitude to flow in collector 77 toward the transistor provided that $e_2$ is also positive.

Figure 2:
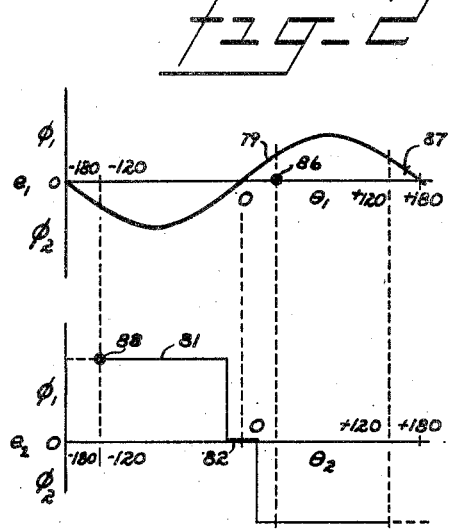
Figure 2 depicts graphs representing space phase variations of a synchro potential and of a potential representing output shaft angular displacement of phase sense, one phase sense being indicated in the graphs by displacement above a datum axis and the other sense by displacement below the axis.

The polarization of transformer secondary winding 48 is such that the phase of the alternating potential $e_2$ is normally or in synchronous operation opposite to the phase of the alternating potential $e_1$. This is illustrated in Fig. 2, in which sinusoidal space phase graph 79 represents the variation with $\theta_1$ of the root-mean-square value of potential $e_1$ of line 18 relative to that of line 16. Graph 79 additionally represents the time phase sense of the potential $e_1$ between lines 18 and 16 relative to a standard, this standard being the phase of the alternating source 13, and the dependence of this sense on $\theta_1$. This phase is arbitrarily selected and depicted so that when $\theta_1$ is negative, the phase of $e_1$ is depicted by negative ordinates, and when $\theta_1$ is positive, by positive ordinates. The phase sense is thus arbitrarily termed $\phi_2$ when depicted by that part of graph 79 which extends below the zero ordinate line, and termed $\phi_1$, 180° from $\phi_2$, when depicted by voltage $e_1$ above the ordinate line.

The R. M. S. value of potential $e_2$ is indicated for all values of $\theta_2$ in graph 81 which is drawn to the same abscissa scale as graph 79, and thus represents at any abscissa the situation when the synchro and servo systems have caused $\theta_2$ to equal $\theta_1$, and when the limits of travel of shaft 22 of +120° and −120° have not been reached. This may be termed normal operation and for the purpose of this description when $\theta_1 = \theta_2$ the two shafts 14 and 22 may be said to be in synchronism.

The numerical R. M. S. value of potential $e_2$ is constant for all values of $\theta_2$ and therefore is indicated in graph 81 by horizontal lines equidistant above and below the zero ordinate line. Phase sense is arbitrarily indicated by the side of the zero ordinate line on which a graph point lies referred to the same phase standard of terminals 13 used with graph 79. The reduction of potential $e_2$ to zero during the movement of contact arm 44 is represented by the short line 82. It is important to note that in normal operation, for those values of $\theta_1 = \theta_2$ for which the phase of $e_1$ is $\phi_1$, that of $e_2$ is $\phi_2$, and vice versa, neglecting the travel period of arm 44.

Figure 3:
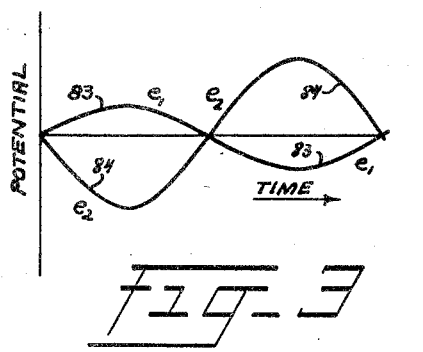
Figure 3 depicts graphs representing the time and amplitude relation between two potentials produced during operation of the invention.

The polarities of $e_1$ and $e_2$ normally applied to the terminal 67 of relay coil 66 and to the base 73 of transistor 71 during the period of a single cycle of the power supply are indicated by the graph of Fig. 3, which indicates time phase, not space phase. The sinusoidal line 83 represents the potential $e_1$ during one period of its alternation. When $\theta_2 = \theta_1$ the limit cam follower 51, Fig. 1, not being against either of the risers of cam 52, graph 84 represents $e_2$. At the small positive angle of $\theta_1$ indicated by point 86, Fig. 2, and as indicated by the depicted cam positions in Fig. 1, the phase senses of $e_1$ and $e_2$ are opposite as shown in Fig. 2 by the intersection of the vertical dashed line through point 86 and the two graphs. This fact is also indicated by the entire lengths of the graphs of Fig. 3. During the left or first half cycle of Fig. 3, $e_1$ is positive, causing current to tend to flow through diode 69, Fig. 1, toward the transistor. But at the same time $e_2$ is negative in conductor 67, so that current cannot flow through the diode or coil 66. During the second half cycle $e_2$ is positive but, $e_1$ being negative, the input signal in the transistor base cuts off the current flow into collector 77.

Let it be supposed that input shaft 14 turns continuously clockwise. The output shaft 22 follows the input shaft and also turns clockwise, and when $\theta_2$ is near zero contact arm 44 is caused by cam 42, as it turns clockwise, to leave contact 46 and move to contact 47. During the travel of arm 44 $e_2$ becomes zero as shown in Fig. 2 by line 82 because conductor 67, Fig. 1, is open, so that no current can flow through relay coil 66. When arm 44 makes contact with contact 47, $\theta_2$ has phase $\phi_2$ and Fig. 2 shows that the phase of $e_2$ becomes $\phi_1$, while $e_1$ has changed to phase $\phi_2$, so that as before their time phases have opposite sense at all times and as before described, the relay does not operate.

Figure 4:
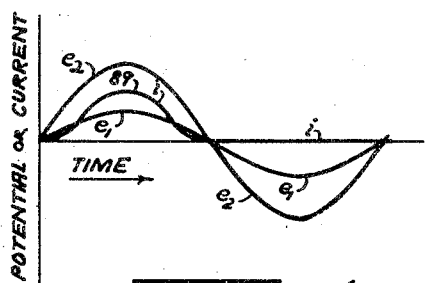
Figure 4 depicts graphs representing relations between time and current and voltage during asynchronous movement of the output shaft.

Eventually shaft 22, Fig. 1, turns clockwise until its angular displacement $\theta_2$ is −120°, at which point cam 52 closes contacts 53. However, since contacts 61 are open nothing else occurs. As the shaft 14 continues to rotate, shaft 22 no longer follows it because the potentiometer 33 slider has reached its stops and can rotate no further. This is the situation in which the shaft 22 is "frozen" against a stop. This "freeze" stalls motor 29 and stops shaft 22. Further clockwise rotation of shaft 14 brings $\theta_1$ to −180 degrees, and further rotation changes the sign of $\theta_1$ and the phase of $e_1$, so that $e_1$ has phase sense $\phi_1$ and a small amplitude such as represented by the point 87, Fig. 2. However, $\theta_2$ is still at −120° as indicated at point 88, and the phase of $e_2$ is still $\phi_1$. This situation is illustrated by the time-amplitude graphs of Fig. 4, $e_1$ and $e_2$ being in phase through the entire cycle as just explained. In the left or first half cycle $e_1$ is positive and therefore tends to cause forward current flow in diode 69, Fig. 1. Since $e_2$ is also positive, positive potential exists in conductor 67, with the result that diode 69 is made conductive and current flows through coil 66, as indicated by the graph 89, Fig. 4, as a function of the product of $e_1$ and $e_2$. Due to the amplification by the transistor, small values of $e_1$ are greatly amplified in their effects on coil 66, Fig. 1, so that relay operation can take place when $e_1$ has risen on its space phase graph, Fig. 2, very slightly above zero. In the second half cycle of Fig. 4 both $e_1$ and $e_2$ are negative, either one being sufficient to preclude current flow through diode 69, Fig. 1, and coil 66. However, the coil current in the first half cycle averaged over the cycle will operate relay 62 at its pickup current value. Capacitor 78 smooths the current throughout the cycle to produce better relay operation.

Current through relay coil 56, Fig. 1, closes contacts 61. Relay 56 thereupon operates, closing holding contacts 54'/54" and transferring servo operation from contact 24 to contact 57. This transfer applies a signal of opposite phase sense to the phase-sensitive servoamplifier 28, so that motor 29 is operated in the direction opposite to that which brought the potentiometer clockwise to its stop 41. This results in counterclockwise full speed rotation by the motor of shaft 22 and potentiometer 33. Limit cam 52 is moved away from its follower but, since the paralleled holding contacts 54'/54" are closed, this does not open relay 56. Angle $\theta_2$ is reduced to zero and beyond, again becoming positive. This transfers cam arm 44 again to contact 46, causing $e_2$ again to have space phase $\phi_2$ as shown in Fig. 2, so that the time phase graph of Fig. 3 again applies. Relay 62 therefore opens, opening relay 56 and returning contact arm 26 to contact 24. The phase of synchro winding 21 potential is now such as to cause motor 29 to continue to turn counterclockwise which it does until the potentiometer 33 reaches stop 39 at +120°, stalling motor 29. Cam 52 now closes contacts 53 but as the relay coil 66 circuit is unenergized and its contacts 61 are open, relay 56 cannot close.

If shaft 14 continues to turn clockwise, at +120° $\theta_1$ becomes equal to $\theta_2$ and further clockwise rotation of shaft 14 drives shaft 22 clockwise at the same angle. If, however, shaft 14 should reverse its motion between 180° and 120° and again cross its 180° position, the earlier described operation will occur in reverse and shaft 22 will be rapidly turned from its +120° stop. Thus, from whichever direction the input shaft should enter the sector of normal operation, at the instant of crossing the 120° position the output shaft 22 would be at the appropriate stop ready to proceed within the normal sector in step with the input shaft.

Thus it will be seen that the output shaft accurately follows the movement of the input shaft over the operative sector of the output until it reaches a limit stop. When a limit stop is reached the output rapidly reverses and is moved to the opposite stop where it waits and picks up to follow continued movement of the input shaft.

What is claimed is:

1. A rotary inductor signal transmitting system comprising, stop means preventing the output signal of said signal transmitting system from executing a full cycle, transistor means sensing the input signal phase relative to a standard of said signal transmitting system, means including cam means sensing the phase relative to said standard of the output signal of said signal transmitting system, comparator means comparing said input and output phase senses, and switching means operated by said comparator means and by stop means changing the direction of progression of said output signal.

2. A rotary inductor signal transmitting system comprising, an input signal shaft in said system, a servo driven output signal shaft in said system, said output signal shaft having stops including cams limiting its angular displacement, transistor means sensing the electrical phase of said inductor signal transmitting system, cam means sensing the sense of said output signal shaft angular position relative to the angular position of said input signal shaft, comparator means including a unilaterally conductive device comparing the sense of said electrical phase with the sense of said angular positions and switching means automatically reversing the direction in which said output signal shaft is driven by said servo when said output signal shaft is at a stop and said electrical phase changes sense.

3. A rotary inductor signal transmitting system comprising, an input signal shaft in said system, an output signal shaft in said system, stops limiting the angular displacement of said output signal shaft to less than one revolution, a servomechanism driving said output signal shaft in direction to minimize its output displacement error relative to the rotation of said input signal shaft, transistor means sensing the electrical phase of said inductor signal transmitting system, cam means sensing the sense of said output signal shaft angular position relative to the angular position of said input signal shaft, comparator means comparing the sense of said electrical phase and said angular position, said comparator means including a unilateral conductivity diode, and electromagnetic switching means reversing the direction of rotation of said output signal shaft by said servomechanism when said output signal shaft displacement is at a limit imposed by said stops and said electrical phase changes sense.

4. A rotary inductor signal transmitting system comprising, an input signal shaft, an electrical transmitting circuit driven by said input signal shaft and having its electrical space phase equal to the mechanical phase of the input signal shaft, an output signal shaft, two stops including electrical contacts limiting the angular displacement of said output signal shaft to less than one revolution, a servomechanism driving said output signal shaft in synchronism between said two stops with the electrical space phase of said electrical transmitting circuit, said servomechanism stalling upon driving the output signal shaft to a stop, transistor means sensing the electrical phase of said electrical transmitting circuit, means including cam means producing a shaft position electrical signal whose phase sense is dependent on the angular position of said output shaft, electromagnetic relay comparator means comparing the phase senses of said electrical transmitting circuit and said shaft position electrical signal, said comparator means including a unilateral conductivity diode and an electromagnetic relay responsive to said comparator means and to the condition of the contacts of said stops reversing the direction in which said servomechanism drives said output signal shaft when the shaft is at a said stop and said electrical phase sense changes.

5. A rotary inductor signal transmitting system comprising, an input signal shaft, an electrical synchro signal transmitting circuit synchronously driven by said input signal shaft having its electrical space phase equal to the mechanical input shaft phase, an output signal shaft, two stops limiting the angular displacement of said output signal shaft to less than one revolution, servomechanism driven by said synchro circuit driving said output signal shaft in synchronism with said input signal shaft between stops, said servomechanism stalling upon driving the output signal shaft to a stop, a transistor connected to sense the electrical phase of said synchro circuit, means operated by said output shaft producing a shaft position signal of one phase or the opposite phase depending on the angular position of said output shaft, an electromagnetic relay and crystal diode comparator connected to said transistor and having said shaft position signal impressed thereon and comparing the phase senses of said synchro circuit and said shaft position signal, and an electromagnetic switch operated by said electromagnetic relay and by said two stops, said switch changing the input of said servomechanism from said synchro circuit to another signal source having opposite phase sense.

6. A rotary inductor signal transmitting system comprising, a first synchro including an input shaft, a second synchro including an output shaft, an electrical transmission circuit interconnecting said first and second synchros, a pair of stops determining the limits of rotation of said output shaft, means including a cam-operated switch producing a signal of one phase or the opposite phase depending on the position of said output shaft, comparator means including a transistor and a unilaterally conductive device for comparing the relative phase senses of said signal and the signal of said transmission circuit, and means operated by said comparator means for reversing the direction of rotation of said output shaft on engagement of one of said stops and concurrent phase sense reversal of the signal of said transmission circuit.

7. A rotary inductor signal transmitting circuit comprising, a synchro transmitter including an input shaft, a synchro control transformer including an output shaft, a displacement signal transmission circut interconnecting said synchros, a rate servomechanism having its electrical input connected to said synchro control transformer and its mechanical output connected to said output shaft, a pair of stops determining the limits of rotation of said output shaft, means including a cam-operated switch and an energizing circuit producing a phase signal of one phase or the opposite phase depending on the position of said output shaft, comparator means including at least one semiconductor device having a plurality of contacts and at least one electromagnetic relay for comparing the relative phase senses of the voltages of said phase signal and said displacement signal, and a circuit including the contacts of said electromagnetic relay reversing the direction of rotation of said output shaft on engagement of one of said pair of stops and concurrent phase sense reversal of said displacement signal relative to said phase signal.

8. A rotary inductor signal transmitting system comprising, a first synchro having an input shaft connected to the rotor thereof, a second synchro having an output shaft connected to its rotor, a displacement signal transmission circuit interconnecting the stators of said first and second synchros, a servo circuit including a servo amplifier having its input normally connected to the rotor of said second synchro for positioning said output shaft in accordance with the signal impressed on the input of said servo amplifier, a pair of stops for determining the limits of rotation of said output shaft in either direction, a phase signal circuit, center tapped transformer means cam operated switch means operated by said output shaft and connecting said phase signal circuit to one or the other end terminals of said transformer means for producing a phase signal in said phase signal circuit of one phase or the opposite phase depending on the position of said output shaft, a transistor having its input connected to said displacement signal transmission circuit and its output connected through a unidirectionally conductive device and a relay coil to said phase signal circuit, said unidirectionally conductive device being so poled as to permit current flow through said relay coil only when the displacement signal in said displacement signal transmission circuit and the phase signal of said phase signal circuit are of like phase, a second relay coil connected in circuit with the contacts of said first mentioned relay and a limit cam switch, said limit cam switch being operated by said output shaft to a closed position only when said output shaft is operated to one or the other of its limit stops, and contact means operated by the energization of said second relay coil to disconnect the input of said servo amplifier from the motor of said second synchro and to connect the input to said phase signal circuit.

No references cited.